(12) United States Patent
deGoma

(10) Patent No.: US 6,296,261 B1
(45) Date of Patent: Oct. 2, 2001

(54) BRAKE ASSISTED STEERING SYSTEM FOR A WHEELED BED

(76) Inventor: Rolando I deGoma, 30 Meadow La., Pennington, NJ (US) 08534

( * ) Notice: Subject to any disclaimer, the term of this patent is extended or adjusted under 35 U.S.C. 154(b) by 0 days.

(21) Appl. No.: 09/351,448

(22) Filed: Jul. 12, 1999

(51) Int. Cl.[7] ............................ A47B 13/00; B60B 33/00; B62B 5/04; B60T 1/02
(52) U.S. Cl. ........................ 280/47.34; 188/1.12; 188/19; 188/29; 5/600
(58) Field of Search ................................. 5/600; 188/1.12, 188/2 D, 19, 29, 57; 280/33.994, 47.34; 16/35 R (56) References Cited

U.S. PATENT DOCUMENTS

| | | |
|---|---|---|
| 2,951,258 | 9/1960 | Brooks et al. . |
| 3,026,558 | 3/1962 | Mulholland . |
| 3,159,865 * | 12/1964 | Shepherd .................................. 5/600 |
| 3,493,085 * | 2/1970 | Libhart ................................. 16/35 R |
| 4,076,266 * | 2/1978 | Krausz .............................. 280/47.34 |
| 4,276,962 * | 7/1981 | Aulik ................................... 16/35 R |
| 4,309,791 * | 1/1982 | Aulik ....................................... 5/600 |
| 4,776,605 | 10/1988 | Hathcock . |
| 5,303,450 * | 4/1994 | Lange ................................... 16/35 R |
| 5,325,938 * | 7/1994 | King .................................... 188/1.12 |
| 5,377,372 * | 1/1995 | Rudolf et al. ............................ 5/600 |
| 5,450,639 * | 9/1995 | Weismiller et al. ...................... 5/600 |
| 5,499,697 * | 3/1996 | Timble et al. ................... 280/33.994 |
| 5,531,295 * | 7/1996 | Kopman et al. ...................... 188/2 D |
| 5,735,367 * | 4/1998 | Brubaker ................................ 188/19 |
| 5,927,441 * | 7/1999 | Luo ........................................ 188/19 |

* cited by examiner

*Primary Examiner*—Lanna Mai
*Assistant Examiner*—Jeffrey J. Restifo
(74) *Attorney, Agent, or Firm*—Michael I. Kroll

(57) ABSTRACT

A brake assisted steering system for use in controlling movement of a bed including a frame and first and second wheels extending from the frame. The brake assisted steering system includes first and second hand levers and first and second brake mechanisms positioned adjacent the first and second wheels, respectively. The first hand lever being connected to the first brake mechanism by a first cable and the second hand lever being connected to the second brake mechanism by a second cable. The first hand lever is movable between a first position in which a force is not applied to the first brake mechanism and the first wheel is free to rotate and a second depressed position in which a force is applied to the first brake mechanism causing the first brake mechanism to engage the first wheel and slow down or halt rotation of the first wheel. The second hand lever is movable between a first position in which a force is not applied to the second brake mechanism and the second wheel is free to rotate and a second depressed position in which a force is applied to the second brake mechanism causing the second brake mechanism to engage the second wheel and slow down or halt rotation of the second wheel. The first and second wheels are each pivotally connected to the frame.

10 Claims, 10 Drawing Sheets

BRAKE ASSISTED STEERING SYSTEM FOR A WHEELED BED

BACKGROUND OF THE INVENTION

1. Field of the Invention

The present invention relates generally to wheeled bed mechanisms and, more specifically, to a system for controlling the movement, direction and braking of a wheeled bed using a hand operated braking system.

2. Description of the Prior Art

Numerous wheeled bed apparatuses designed to aid in the movement of a hospital bed have been provided in the prior art. For example, U.S. Pat. Nos. 2,951,258; 3,026,558; 4,776,605 and 5,377,372 are all illustrative of such prior art. While these wheeled beds may be suitable for the purposes for which they were designed, they would not be as suitable for the purposes of the present invention, as hereinafter described.

U.S. Pat. No. 2,951,258

Inventor: H. E. H. Brooks et al.

Issued: Sep. 6, 1960

This United States Patent discloses castors incorporating brakes which are easy to operate and which are efficient in immobilizing the article to which they are attached to.

U.S. Pat. No. 3,026,558

Inventor: K. A. Mulholland

Issued: Mar. 27, 1962

This United States Patent discloses a wheeled assembly which is selectively swivelable or non-swivelable about a substantially vertical axis and provided with torsion suspension apparatus for yieldably supporting a load.

U.S. Pat. No. 4,776,605

Inventor: John E. Hathcock

Issued: Oct. 11, 1988

A wheeled bed apparatus includes a planar supporting surface stretched between a plurality of upper longitudinal and transverse tubular members forming a patient platform. The platform is pivotally affixed to a plurality of vertical tubular support members maintained in an erect use position by a plurality of transverse frame members and diagonal braces. Hand wheels associated with two large supporting wheels permit propulsion of the apparatus by a patient while reposing atop the supporting surface. Coupling elements joining the various tubular members permit collapsing of the apparatus for storage.

U.S. Pat. No. 5,377,372

Inventor: Kenneth O. Rudolf et al.

Issued: Jan. 3, 1995

A castor control mechanism for a hospital bed having a plunger type neutral/brake/steer castor comprises a linkage including a rocker arm pivotally mounted to the base of the bed, a link connected on one end to the rocker arm and being connected on its other end through a cam and follower mechanism to a shaft rotatably mounted to the base and rotatable by a foot pedal. Operation of the foot pedal moves the plunger of the castor via the rocker arm to place the castor in its steer, neutral and brake positions.

SUMMARY OF THE PRESENT INVENTION

The present invention relates generally to wheeled bed mechanisms and, more specifically, to a system for controlling the movement, direction and braking of a wheeled bed using a hand operated braking system.

A primary object of the present invention is to provide a brake assisted steering system for a wheeled bed that will overcome the shortcomings of prior art devices.

A further object of the present invention is to provide a brake assisted steering system for a wheeled bed able to allow for easily maneuvering the wheeled bed from one location to another by a single person.

Another object of the present invention is to provide a brake assisted steering system for a wheeled bed having left and right brakes which operate independently of one another.

A yet further object of the present invention is to provide a brake assisted steering system for a wheeled bed including a cable attached between each of the left and right brakes and a respective brake hand lever for independently operating the left and right brakes.

A still further object of the present invention is to provide a brake assisted steering system for a wheeled bed including left and right hand levers each connected to a respective one of the left and right brakes by the cable, each hand lever is grasped by a user and manually operated to activate operation of a respective one of the left and right brakes.

An even further object of the present invention is to provide a brake assisted steering system for a wheeled bed which is able to facilitate turning of the bed when being moved by activating one of the left and right hand levers causing its respective brake to be activated.

Additional objects of the present invention will appear as the description proceeds.

A brake assisted steering system for use in controlling movement of a bed including a frame and first and second wheels extending from the frame is disclosed by the present invention. The brake assisted steering system includes first and second hand levers and first and second brake mechanisms positioned adjacent the first and second wheels, respectively. The first hand lever being connected to the first brake mechanism by a first cable and the second hand lever being connected to the second brake mechanism by a second cable. The first hand lever is movable between a first position in which a force is not applied to the first brake mechanism and the first wheel is free to rotate and a second depressed position in which a force is applied to the first brake mechanism causing the first brake mechanism to engage the first wheel and slow down or halt rotation of the first wheel. The second hand lever is movable between a first position in which a force is not applied to the second brake mechanism and the second wheel is free to rotate and a second depressed position in which a force is applied to the second brake mechanism causing the second brake mechanism to engage the second wheel and slow down or halt rotation of the second wheel. The first and second wheels are each pivotally connected to the frame.

The present invention overcomes the shortcomings of the prior art by providing a hospital bed having independently operated left and right breaking mechanisms having a cable connected to a hand lever at the rear of the bed whereby when the bed is in motion the attendant can use the inertia of the moving bed to control the movement and direction of the bed by applying the left or right brake at adjustable intensity using the left or right control mechanism located on the hand lever.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Turning now descriptively to the drawings, in which similar reference characters denote similar elements throughout the several views, the Figures illustrate the of the brake assisted steering system for a wheeled bed of the present invention. With regard to the reference numerals used, the following numbering is used throughout the various drawing figures.

10 brake assisted steering system for a wheeled bed of the present invention
12 wheeled bed
14 person moving bed including brake assisted steering system for a wheeled bed
16 wheels of bed
18 legs of bed
20 bed frame
22 mattress atop bed
24 person in bed
26 hand lever mechanism of front wheel brake assisted steering system
28 grip bar on bed
30 hand lever
32 arrow indicating direction of pivoting of hand lever
33 cable
34 sheath surrounding cable
35 spring
36 braking mechanism
37 stopper
38 clamping device securing grip bar to frame
39 terminal end of the cable sheath
40 caster
41 back wall of caster
42 arrow indicating pivoting of wheel about leg
43 brake assembly
44 pin connecting brake assembly to caster
45 first recess extending through brake assembly
46 second recess extending through brake assembly
47 top leg of brake assembly
48 loop extending through second recess
49 hole in loop through which cable terminates
50 stopper securing cable to loop
51 arrow indicating pivoting movement of cable
52 return mechanism
53 pin of return mechanism
54 adjustable stopper of return mechanism
55 spring of return mechanism
56 brake pad 57 screw for adjustable stopper 58 arrow indicating forward movement of bed 59 arrows indicating direction of movement of adjustable stopper 60 arrow indicating depression of left side hand lever 62 arrow indicating direction of movement of left side brake mechanism 64 arrow indicating bed making left turn 66 arrow indicating depression of right side hand lever 68 arrow indicating direction of movement of right side brake mechanism 70 arrow indicating bed making right turn

DETAILED DESCRIPTION OF THE PREFERRED EMBODIMENT

Turning now descriptively to the drawings, in which similar reference characters denote similar elements throughout the several views, FIGS. 1 through 8 illustrate the brake assisted steering system for a wheeled bed of the present invention indicated generally by the numeral 10.

Figure 1:
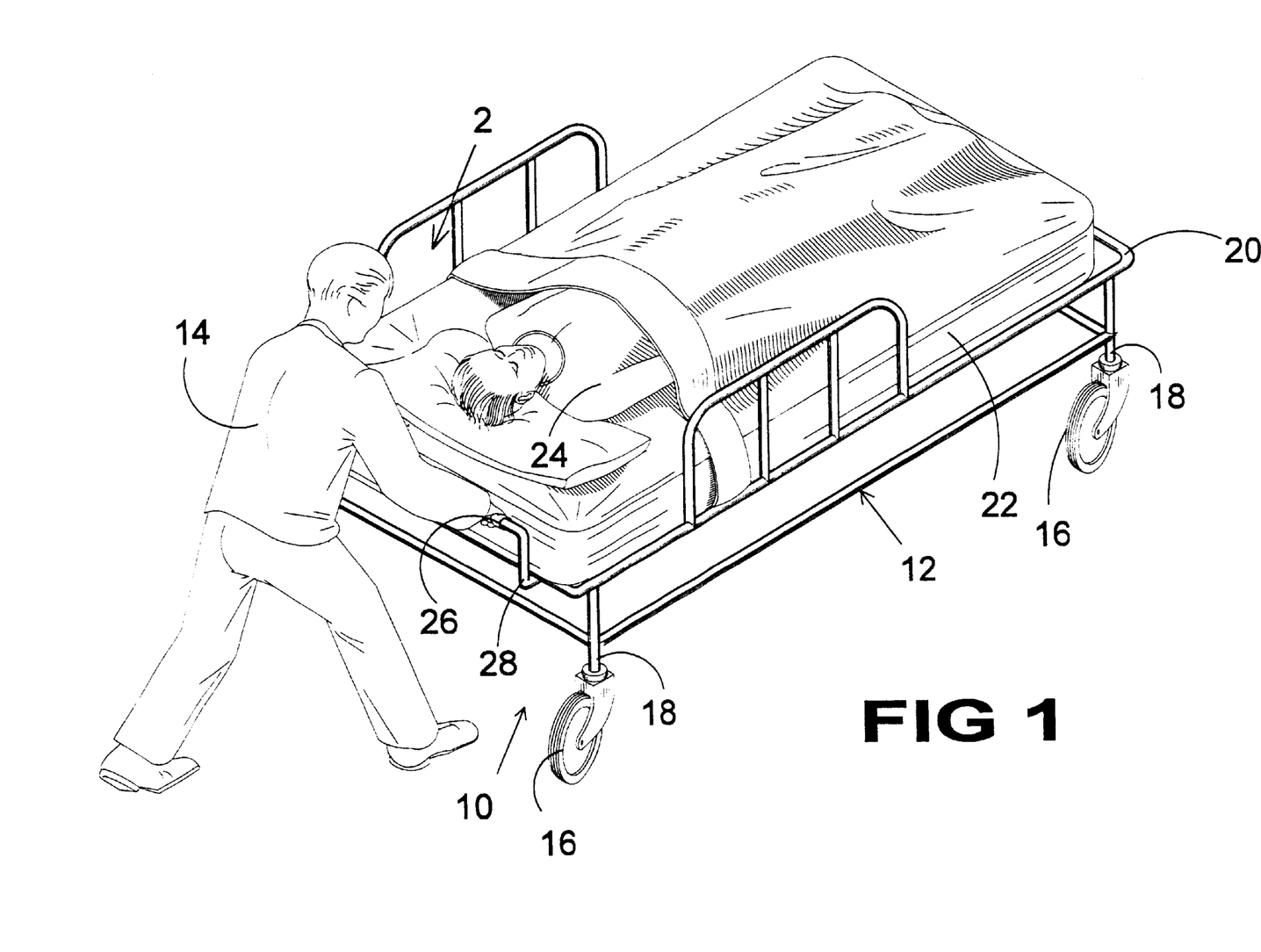
FIG. 1 is a perspective view of a hospital attendant pushing an occupied hospital bed equipped with the brake assisted steering system for a wheeled bed of the present invention.

The brake assisted steering system 10 is shown in FIG. 1 connected to a wheeled bed 12. The wheeled bed 12 is being moved by a person 14, the direction of motion being controlled by the brake assisted steering system 10. The bed 12 includes legs 18 and a wheel 16 extending from each leg 18 thereof. A frame 20 connects the legs 18 together. The frame 20 is designed to support a mattress 22 thereatop on which a person 24 may lay. The wheels 16 are able to pivot about their respective leg 18 and thus allow the bed 12 to turn when moved.

The brake assisted steering system 10 includes a pair of hand lever mechanisms 26 secured to a gripping bar 28. The hand lever mechanisms 26 are connected to a brake mechanism 36 positioned adjacent front wheels of the bed 12. The brake mechanism 36 is clearly illustrated in FIGS. 3–7 and will be described in detail hereinafter. The brake assisted steering system 10 is in a normally disengaged position allowing the bed 12 to move freely. When the person 14 moving the bed 12 activates one of the hand lever mechanisms 26, the brake mechanism 36 connected thereto is caused to engage its respective wheel 16 thereby slowing or halting rotation of the wheel 16. Activation of one of the brake mechanisms 36 causes the bed 12 to turn towards the activated brake mechanism 36. When both hand lever mechanisms 26 are activated, both brake mechanisms 36 are activated and the movement of the bed 12 is caused to cease.

Figure 2:
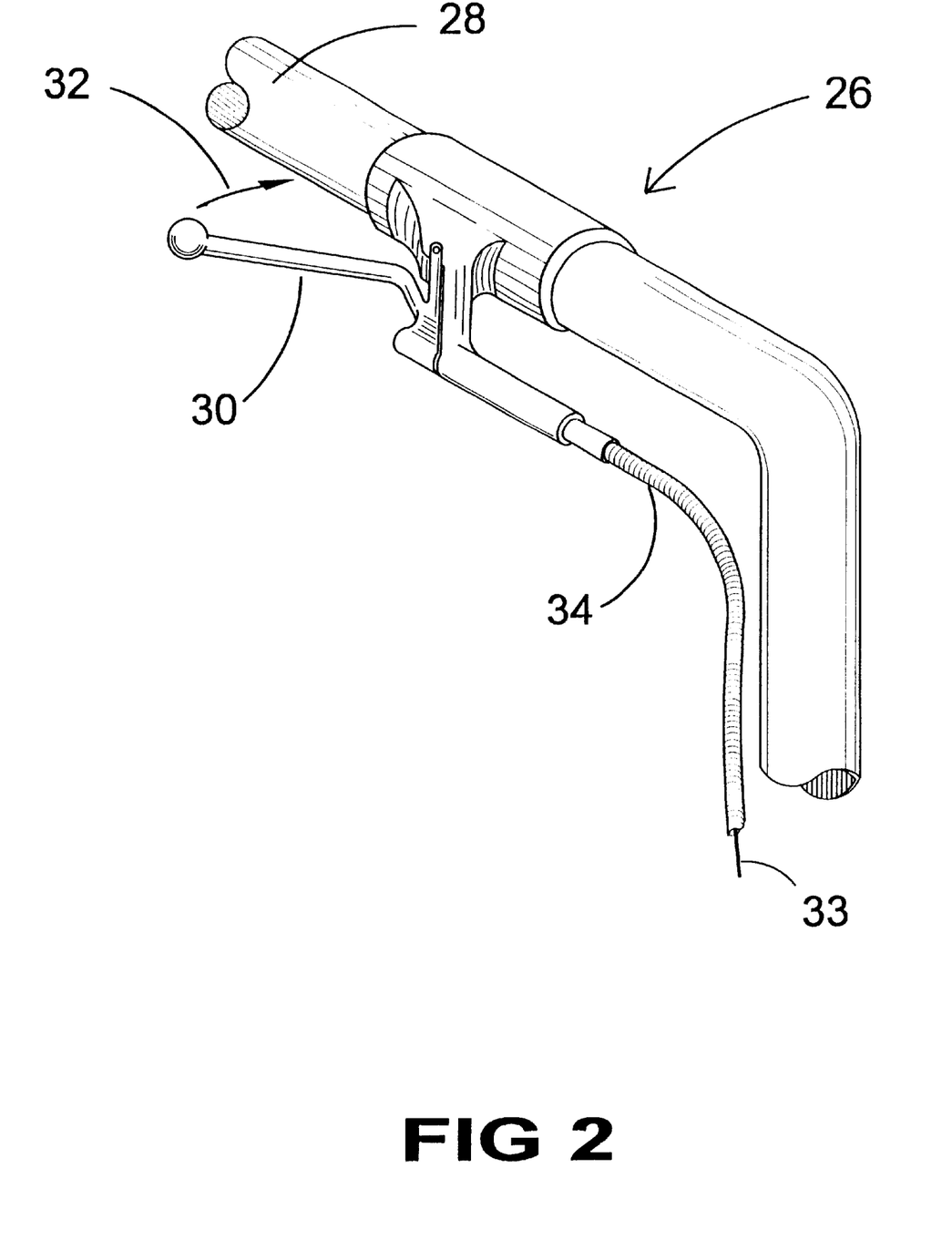
FIG. 2 is an enlarged perspective view of one of the brake actuating levers being utilized to affect steering of a hospital bed equipped with the brake assisted steering system for a wheeled bed of the present invention.
Figure 8:
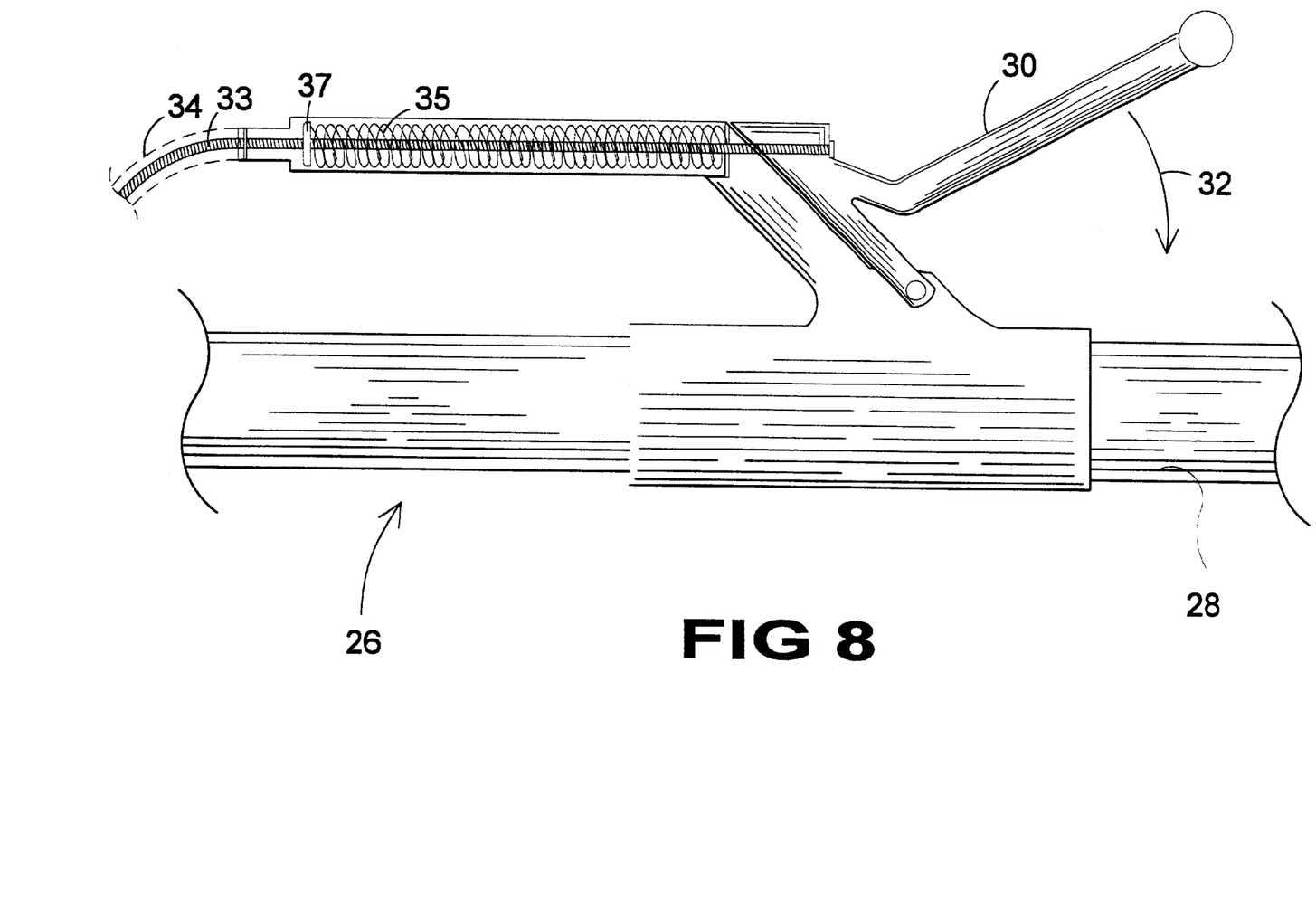
FIG. 8 is an enlarged partial cross-sectional view of the brake hand lever for the brake assisted steering system for a wheeled bed of the present invention.

An enlarged view of a hand lever mechanism 26 is illustrated in FIGS. 2 and 8, FIG. 8 showing a partial cross-section thereof. As can be seen From these figures, the hand lever mechanism 26 is connected to the grip bar 28 and includes a hand lever 30. The hand lever 30 is movable in the direction of the arrow labeled 32 for activating the braking system 10. The hand lever 30 is connected to a respective brake mechanism 36 via a cable 33 extending through a semi-rigid sheath 34. The cable 33 extends from the hand lever 30 and into the grip bar 28. The cable 33 then extends through the grip bar 28 and the frame 20 for connection to a respective brake mechanism 36. A spring 35 extends around a portion of the cable 33 at the connection point with the hand lever 30 and a stopper 37 is connected to the cable 33 at a distance from the connection to the hand lever 30. The spring 35 is positioned between the connection point and the stopper 37. When a force is applied to the hand lever 30 causing the hand lever 30 to pivot in the direction of the arrow labeled 32, a pulling force is applied to the cable 33. The pulling force causes the cable 33 to be lifted thereby pivoting the brake mechanism 36 to engage the wheel 16, slowing or halting the rotation of the wheel 16. The pulling force also causes the stopper 37 to be moved towards the hand lever 30 thereby tensioning the spring 35. Upon removal of the force on the hand lever 30, the hand lever 30 returns to its original at rest position. Removal of the force on the hand lever 30 causes the spring 35 to recoil thereby returning the stopper 37 and cable 33 to which the stopper 37 is attached to its original at rest position. Movement of the cable 33 causes the braking mechanism 36 to pivot back to its at rest position disengaged from the wheel 16 as will be discussed hereinafter. Alternatively, the cable 33 may extend down along a side of the grip bar 28 and frame 20 towards a respective one of the brake mechanisms 16, the cable 33 being secured to an outer side of the grip bar 28 and frame 20.

Figure 3:
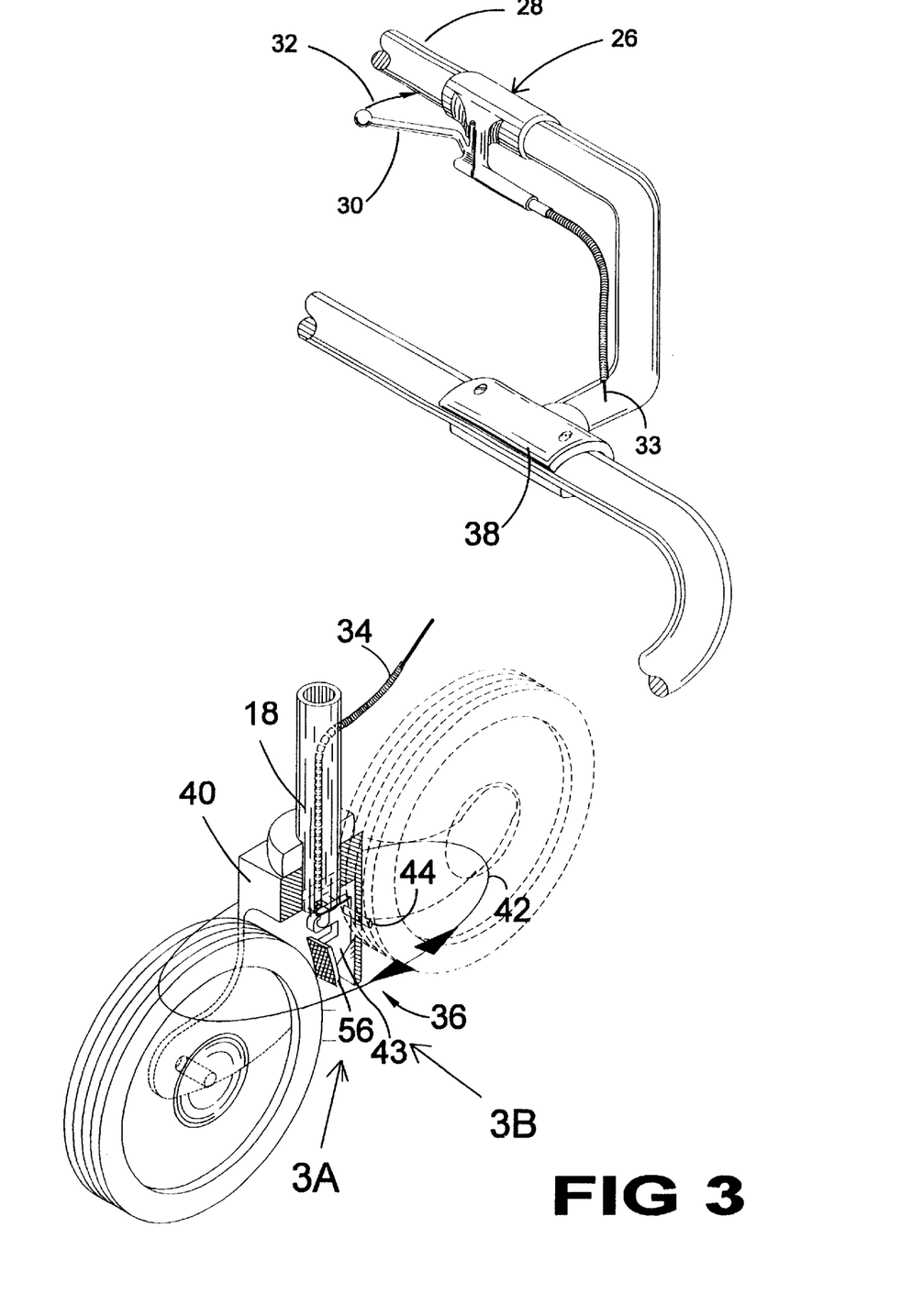
FIG. 3 is a perspective view of portions of a right side brake of the brake assisted steering system for a wheeled bed of the present invention.
Figure 3A:
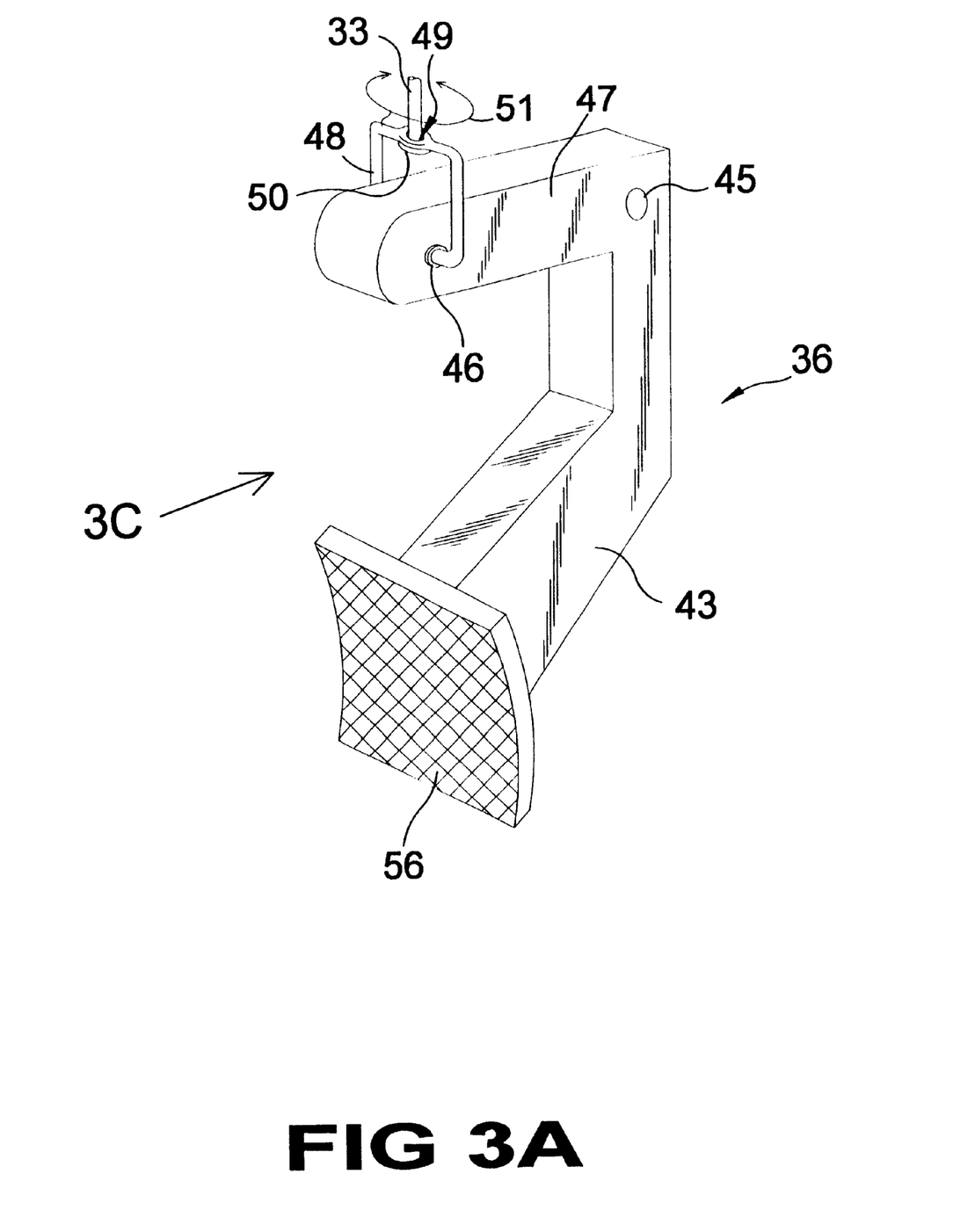
FIG. 3A is an enlarged view of the brake mechanism of the brake assisted steering system for a wheeled bed of the present invention taken in the direction of the arrow labeled 3A in FIG. 3.
Figure 3B:
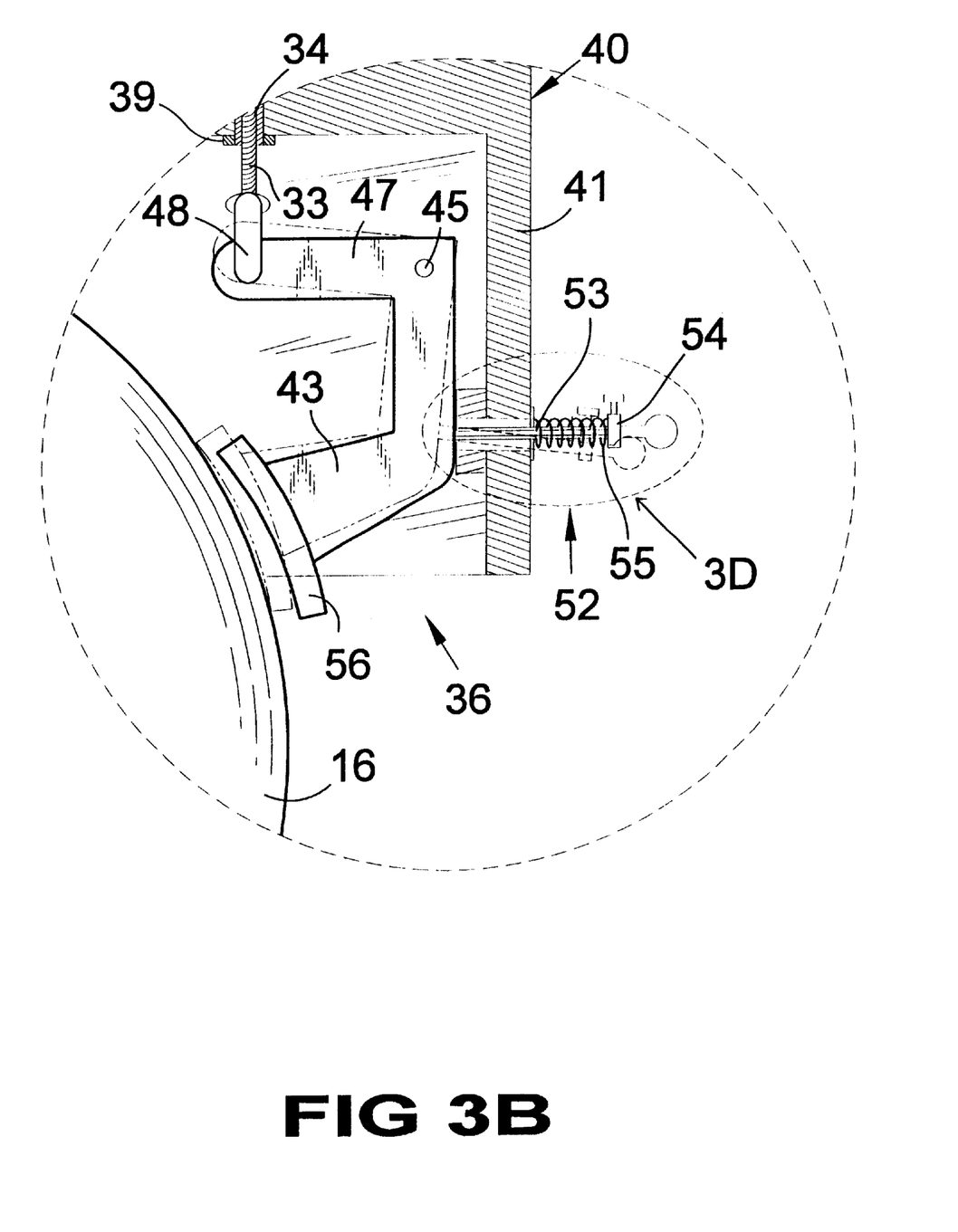
FIG. 3B is an enlarged view of the brake mechanism connected to a wheel of a hospital bed of the brake assisted steering system for a wheeled bed of the present invention taken in the direction of the arrow labeled 313 in FIG. 3.
Figure 3C:
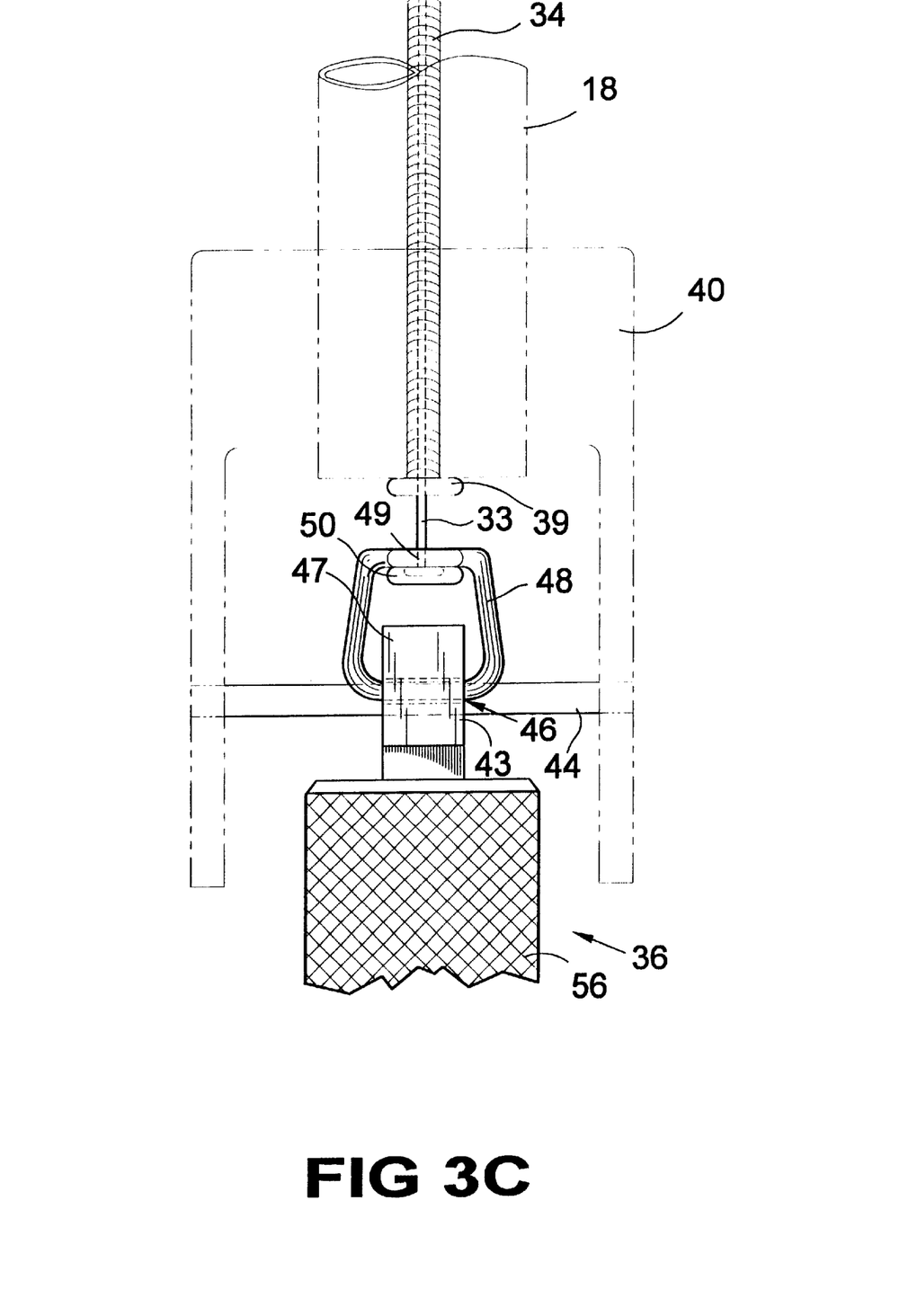
FIG. 3C is a front partial view of the brake mechanism of the brake assisted steering system for a wheeled bed of the present invention.
Figure 3D:
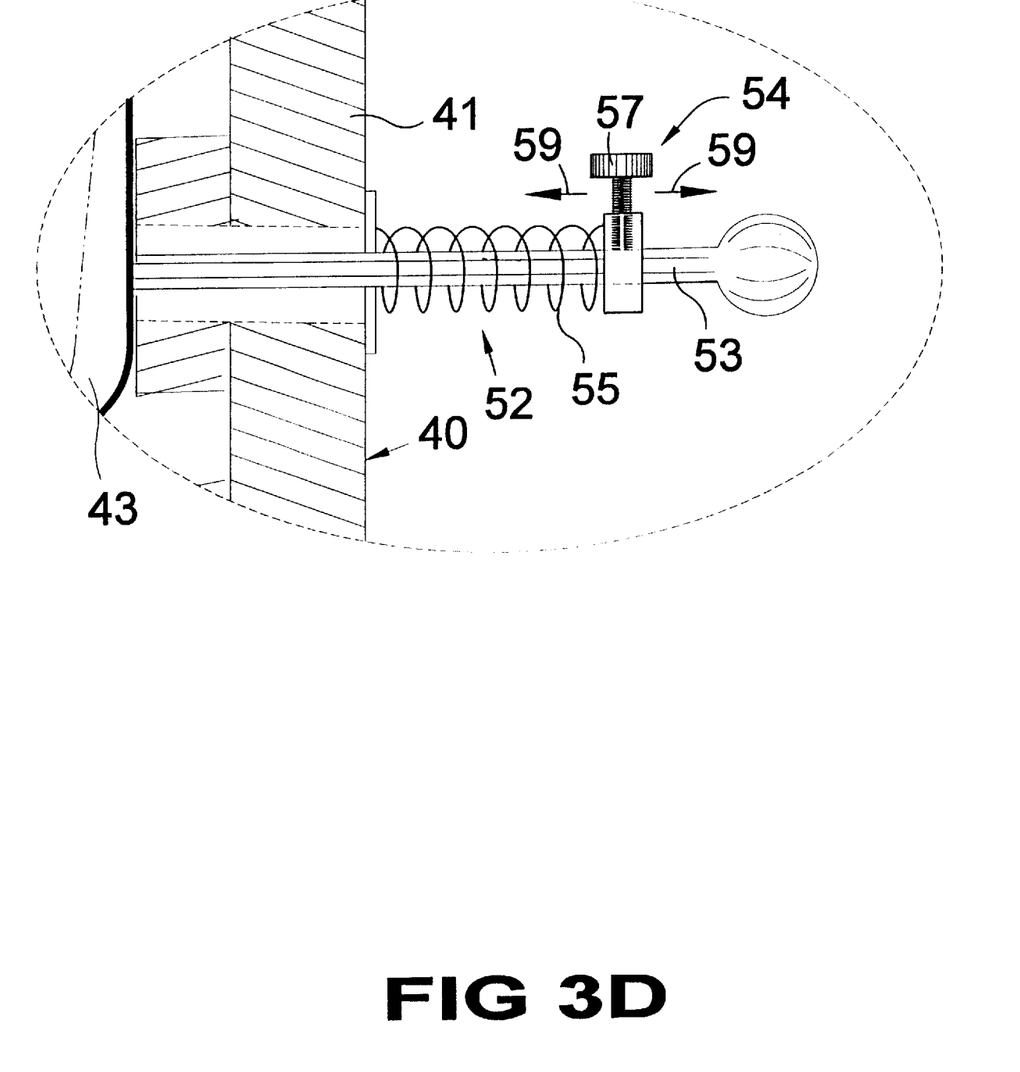
FIG. 3D is a side view of the return mechanism for the brake mechanism of the brake assisted steering system for a wheeled bed of the present invention taken from within the circle labeled 3D in FIG. 3B.

A perspective view of one braking mechanism 36 of the brake assisted steering system 10 is illustrated in FIGS. 3–3D. As can be seen from FIG. 3, the hand lever 30 is connected to the grip bar 28. The cable 33 is connected to the hand lever 30 and extends into the grip bar 28. The grip bar 28 is hollow inside allowing the cable 33 to extend therethrough. The grip bar 28 is secured to the frame 20 by a clamping device 38. The frame 20 is also formed of a hollow bar thereby enabling the cable 33 to extend therethrough. The leg 18 extends from the frame 20 and is connected to the wheel 16 through a caster 40. The leg 18 extends through the caster 40 forming a pivotal connection therewith allowing the wheel 16 to pivot about the leg 18 as is indicated by the arrow labeled with the numeral 42. The cable 33 and sheath 34 extend through the grip bar 28, the frame 20 and the leg 18 to connect with a braking mechanism 36 as will be discussed hereinbelow. The cable 33 extends beyond the leg 18 as shown in FIG. 3C with the sheath 34 extending only to the base of the leg 18. The terminal end 39 of the cable sheath is fixedly anchored to the wall of the leg 18 of the bed 12 as can be seen in FIG. 3B.

The caster 40 is a U-shaped member including a back side 41 as is clearly seen from the dashed outline in FIG. 3C. A respective wheel 16 is pivotally connected between the legs of the caster 40. The braking mechanism 36 is illustrated in FIG. 3A and includes a substantially C-shaped pivoting member 43 having a first recess 45 extending through a top corner thereof. The pivoting member 43 is positioned adjacent the wheel 16 and is also secured between the legs forming the caster 40 by a pin 44. The pin 44 is connected between the legs of the caster 40, extending through the recess 45.

A second recess 46 extends through a top leg 47 forming the pivoting member 43. A loop 48 extends through the second recess 46 and connects the brake assembly 43 to the cable 33. The loop 48 includes a hole 49 extending through a side opposite the connection to the brake assembly 43 and the cable 33 extends through the hole 49. A stopper 50 is connected to an end of the cable 33 securing the cable 33 to the loop 48 and allowing the cable 33 to pivot as indicated by the arrow labeled with the numeral 51. A brake pad 56 is connected to a leg of the pivoting member 43 opposite the connection to the cable 33.

Extending through a back side 41 of the caster 40 and shown in FIGS. 3B and 3D is a return mechanism 52. The return mechanism 52 includes a pin 53 which extends through a recess 54 in the back wall 41 of the caster 40 and connects to the pivoting member 43. An adjustable stopper 54 is slidably connected to the pin 53 on a side of the back wall 41 opposite the pivoting member 43. A spring 55 encircles the pin 53 and is positioned between the stopper 54 and the back wall 41. The adjustable stopper 54 includes a screw 57 which allows the adjustable stopper 54 to move along the length of the pin 53 as indicated by the arrows labeled with the numeral 59. The screw 57 secures the stopper 54 in a desired position along the length of the pin 53 thus setting the tension in the spring 55.

When the hand lever 30 is grasped and squeezed by a user, a pulling force is applied to the cable 33 and thus to the loop 48. The force applied to the loop 48 pulls the end of the top leg 47 of the pivoting member 43 to be lifted at the point at which the loop 48 is connected. The lifting of the top leg 47 causes the pivoting member 43 to pivot about the pin 44. As the brake alignment device 48 pivots, brake pad 56 will be caused to pivot towards its respective wheel 16 thereby engaging the wheel 16 causing the rotation of the wheel 16 to slow down or cease. Furthermore, as the brake pad 56 pivots towards the wheel 16, the pivoting member 43 pulls the pin 53 of the return mechanism 52 partially through the back wall 41 of the caster 40 thereby tensioning the spring 55 connected between the back wall 41 and the adjustable stopper 54.

When the hand lever 30 is released by the user, the force applied to the loop 48 is removed. Removal of the force on the loop 48 will allow the spring 55 to recoil. The recoiling of the spring 55 causes the pin 53 of the return member 52 to be pulled back through the back wall 41. As the pin 53 is pulled through the back wall 41, the pivoting member 43 is caused to pivot about the pin 44 towards the back wall 41. As the pivoting member 43 pivots towards the back wall 41, the brake pad 56 is caused to pivot away from the wheel 16 and thus disengage from the wheel 16. This will allow the wheel 16 to freely rotate.

Figure 4:
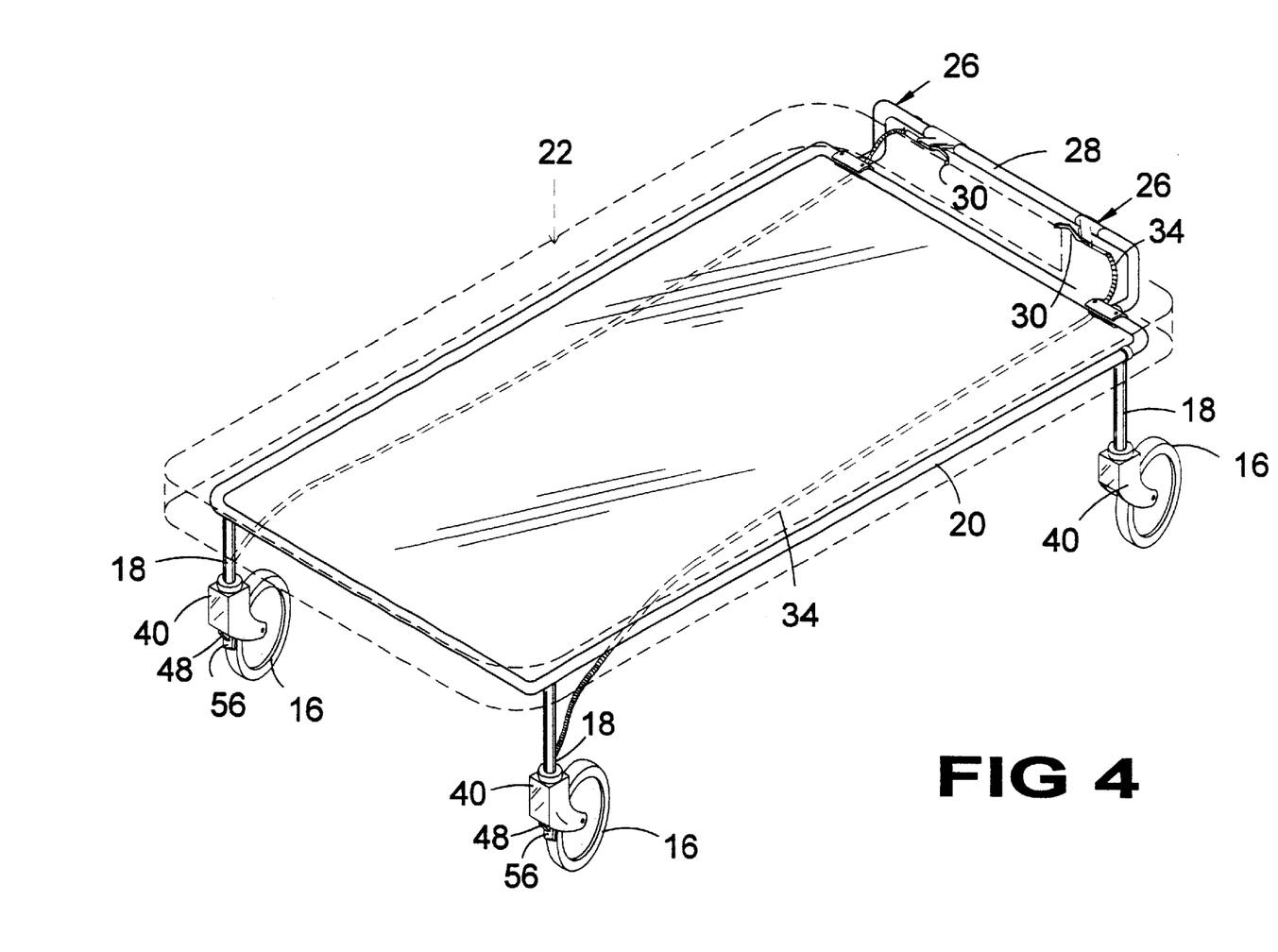
FIG. 4 is a top perspective view of a bed frame including the brake assisted steering system for a wheeled bed of the present invention, a mattress is shown in dashed lines atop the bed frame.

A top view of a wheeled bed 12 including the brake assisted steering system 10 of the present invention is illustrated in FIG. 4. A mattress 22 is illustrated in dashed lines atop the frame 20. The brake assisted steering system 10 illustrated in this figure is connected to wheels 16 located on a side of the frame 20 opposite the grip bar 28 and hand levers 30. As can be seen from the cross-sectional view of a portion of the bed frame 20, the cable 33 extends through the entire bed frame 20 to connect a hand lever 30 with its respective wheel 16.

Figure 5:
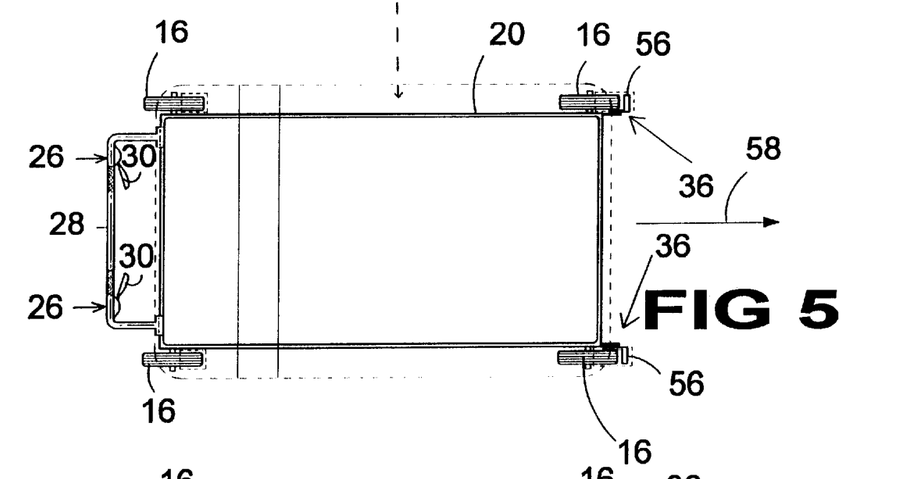
FIG. 5 is a top plan view of a bed frame including the brake assisted steering system for a wheeled bed with both braking hand levers in an uncompressed position enabling the bed to be pushed straight ahead, a mattress is illustrated in dashed lines atop the bed frame.

FIG. 5 illustrates the position of the hand levers 30 and the brake mechanisms 36 when it is desired to move the bed 12 in a forward direction. The forward motion of the bed 12 is indicated by the arrow labeled with the numeral 58. To move the bed 12 in this direction, neither of the hand levers 30 is depressed and all wheels 16 are free to rotate. As can be seen from this figure, neither of the brake mechanisms 36 are engaged with their respective wheel 16 thus allowing the wheels 16 to rotate freely.

Figure 6:
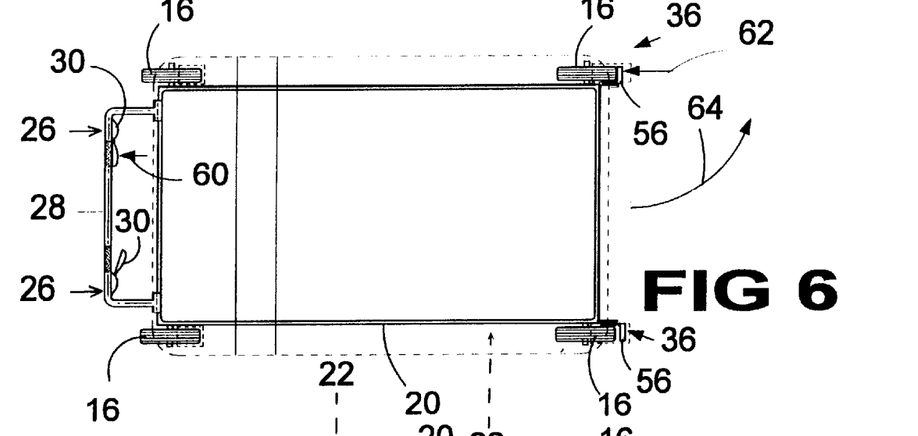
FIG. 6 is a top plan view of a bed frame including the brake assisted steering system for a wheeled bed with only the left braking hand lever in a compressed position enabling the bed to be turned to the left, a mattress is illustrated in dashed lines atop the bed frame.

FIG. 6 illustrates the position of the hand levers 30 and the brake mechanisms 36 when it is desired to turn the bed 12 to the left. The motion of the bed 12 turning to the left is indicated by the arrow labeled with the numeral 64. To move the bed 12 in this direction, the left side hand lever 30 is depressed thereby engaging the left side brake mechanism 36 with the left side wheel 16. As can be seen from this figure, the brake mechanism 36 on the left side of the bed 12 is engaged with its respective wheel 16 thus slowing or halting the rotation of the left side wheel 16. The remaining wheels are free to rotate and as can be seen, the right side brake mechanism 36 is not engaged with the right side wheel 16. In this position, the bed 12 will use the left side wheel 16 as a pivot point causing the bed 12 to turn towards the left side wheel 16. Pivoting of the bed 12 will cease upon release of the left side hand lever 30.

Figure 7:
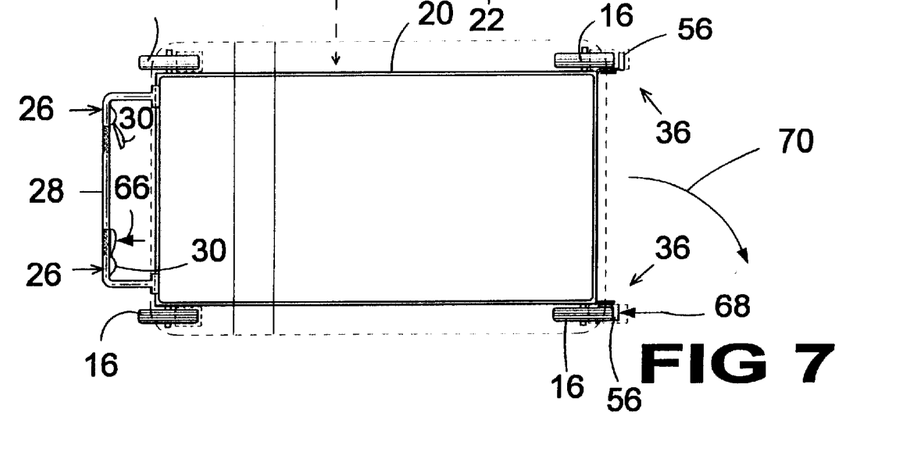
FIG. 7 is a top plan view of a bed frame including the brake assisted steering system for a wheeled bed with only the right braking hand lever in a compressed position enabling the bed to be turned to the right, a mattress is illustrated in dashed lines atop the bed frame.

FIG. 7 illustrates the position of the hand levers 30 and the brake mechanisms 36 when it is desired to turn the bed 12 to the right. The motion of the bed 12 turning to the right is indicated by the arrow labeled with the numeral 70. To move the bed 12 in this direction, the right side hand lever 30 is depressed thereby engaging the right side brake mechanism 36 with the right side wheel 16. As can be seen from this figure, the brake mechanism 36 on the right side of the bed 12 is engaged with its respective wheel 16 thus slowing or halting the rotation of the right side wheel 16. The remaining wheels are free to rotate and as can be seen, the left side brake mechanism 36 is not engaged with the left side wheel 16. In this position, the bed 12 will use the right side wheel 16 as a pivot point causing the bed 12 to turn towards the right side wheel 16. Pivoting of the bed 12 will cease upon release of the right side hand lever 30.

In order to cease the movement of the bed 12 both the left and right side hand levers 30 are depressed. This will engage both the left and right side brake mechanisms 36 causing the respective wheels 16 connected thereto to cease rotation.

The operation of the front wheel brake assisted steering system 10 will now be described with reference to the figures. In operation, the brake assisted steering system 10 of the present invention is positioned on a wheeled bed 12 with a braking mechanism 36 connected to the casters 40 of two of the wheels 16 of the bed 12. When it is desired to move the wheeled bed 12 a person moving the bed 12 will unlock any locks preventing the wheels 16 from rotating and grasp the grip bar 28 at a position near the hand levers 30. The brake mechanisms 36 are normally disengaged from its respective wheel 16 allowing the bed 12 to be pushed freely without resistance. At this point the user will begin to push the bed 12.

When it is desired to turn the bed 12 the user will grasp and squeeze the hand lever 30 on the side of the bed 12 towards which a turn is desired. Squeezing the hand lever 30 will exert a tension on both the cable 33 and the loop 48 to which the cable 33 is connected. The tension applied to the cable 33 will cause the cable 33 to be pulled a slight distance toward the hand lever 30. As the cable 33 is moved in this direction, the stopper 37 will move therewith causing the spring 35 to become tensioned. The force applied to the loop 48 causes the pivoting member 43 to pivot about the pin 44. As the pivoting member 43 pivots, the brake pad 56 will be caused to pivot towards its respective wheel 16 thereby engaging the wheel 16 and causing rotation of the wheel 16 to slow down or cease. Furthermore, as the pivoting member 43 pivots, the pin 53 of the return mechanism 52 will be pulled through the recess in the back wall 41 and towards the wheel 16. Movement of the pin 53 in this direction will cause the spring encircling the pin 53 to become tensioned. If the brake mechanism 36 was applied to slow down or halt the rotation of a single wheel 16, the bed 12 will use the wheel 16 as a pivot point and thus pivot about the wheel 16 thereby turning the bed 12. If both wheels 16 are prevented from rotating by the by the braking mechanism 36, movement of the bed 12 will be prevented.

The pivoting or turning of the bed 12 will continue until the hand lever 30 is released by the user. Release of the hand lever 30 will remove the force applied to the cable 33 and thus the loop 48. Removal of the force on the cable 33 allows the spring 35 to recoil thus allowing the cable 33 to return to its original at rest position. The recoiling of the spring 35 releases the force applied to the loop 48 and allows the spring 55 to recoil. As the spring 55 recoils the pin 53 is pulled back through the recess in the back wall 41. The movement of the pin 53 and the connection between the pin 53 and pivoting member 43 cause the pivoting member to pivot about the pin 44 and pull the brake pad 56 away from the wheel 16. The brake pad 56 thus, becomes disengaged from the wheel 16. This will allow the wheel 16 to freely rotate. At this point the bed 12 is free to move in a straight forward direction. In order to turn the bed 12 in the opposite direction, the opposing hand lever 26 must be squeezed.

Once the bed reaches its destination, the user will squeeze both hand levers 30 causing the wheels 16 to stop rotating. When the wheels 16 are prevented from rotating the bed 12 will no longer move. At this point any additional locks on the wheels 16 are engaged and the bed 12 will remain in its desired location until it is desired to once again move the location of the bed 12.

From the above description it can be seen that the brake assisted steering system of the present invention is able to overcome the shortcomings of prior art devices by providing a brake assisted steering system which is able to allow for easily maneuvering a wheeled bed from one location to another by a single person. The brake assisted steering system includes left and right brakes connected to a respective one of left and right hand levers by a cable attached therebetween, each hand lever being grasped by a user and manually operated to activate operation of a respective one of the left and right brakes. The brake assisted steering system is also able to facilitate turning of the bed when being moved by activating one of the left and right hand levers causing its respective brake to be activated. Furthermore, the front wheel brake assisted steering system for a wheeled bed of the present invention is simple and easy to use and economical in cost to manufacture.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can. by applying current knowledge, readily adapt it for various applications without omitting features that, from the standpoint of prior art, fairly constitute essential characteristics of the generic or specific aspects of this invention.

What is claimed is:

1. A brake assisted steering system for use in controlling movement of, and in combination with, a bed including a frame and first and second wheels extending from the frame, said brake assisted steering system comprising:
   a) a first hand lever;
   b) a second hand lever;
   c) a first brake mechanism positioned adjacent the first wheel;
   d) a second brake mechanism positioned adjacent the second wheel;
   e) first means for coupling said first hand lever and said first brake mechanism;
   f) second means for coupling said second hand lever t said second brake mechanism whereby said first hand lever is movable between a first position in which said first brake mechanism is disengaged from the first wheel thereby allowing the first wheel to rotate and a second depressed position in which a force is applied to said first brake mechanism causing said first brake mechanism to engage the first wheel thereby slowing down or preventing rotation of the first wheel and said second hand lever is movable between a first position in which said second brake mechanism is disengaged from the second wheel allowing the second wheel to rotate and a second depressed position in which a force is applied to said second brake mechanism causing said second brake mechanism to engage the second wheel thereby slowing down or preventing rotation of the second wheel;
   g) the first and second wheels are pivotally connected to the frame by first and second casters, respectively, and said first and second brake mechanisms are pivotally connected to the first and second casters, respectively;
   h) said first and second brake mechanisms each include a pivotal member pivotally connected to said respective caster and positioned adjacent to the respective wheel, said pivotal member being connected to and caused to pivot by said respective coupling means, said first and second brake mechanisms each further including a brake pad connected to an end of said pivotal member opposite said connection to said respective coupling means for engaging the respective wheel when said brake mechanism is in second position;
   i) each said pivoting member includes a first recess and said first and second brake mechanisms each further includes a loop extending through said first recess and connected to said respective coupling means;
   j) said first and second coupling means are each a cable wire, said cable wire being pivotally connected to said respective loop;
   k) said first and second brake mechanisms each further includes a return mechanism for pivoting said respective brake mechanism back to said first position upon release of said force on said respective hand lever; and
   l) the first and second casters are U-shaped including a back wall and said return mechanism of both said first and second brake mechanisms each include a pin extending through the back wall of the respective caster for connection with said respective pivoting member, an adjustable stopper slidably positioned on said pin, and a first spring encircling said pin and positioned between the back wall and said adjustable stopper on a side of the back wall opposite said respective pivoting member wherein said first spring is tensioned when said respective pivoting member is caused to pivot towards its respective wheel and said first spring is able to recoil upon removal of said force on said respective hand lever thereby pivoting said respective brake assembly away from its respective wheel and into said first position.

2. The brake assisted steering system as recited in claim 1, further comprising a grip bar extending from the frame, said first and second levers each being positiones on said grip bar.

3. The brake assisted steering system as recited in claim 2, wherein said grip bar and said frame are hollow, said first and second coupling means both extending within said grip bar and frame between said respective ones of said first and second hand levers and brake mechanisms.

4. The brake assisted steering system as recited in claim 3, wherein said coupling means is a cable wire.

5. A brake assisted steering system for controlling movement of, and in combination with, a bed including a frame and at least one wheel connected to the frame, said brake assisted steering system comprising:
 a) at least one lever;
 b) at least one brake mechanism positioned adjacent said at least one wheel;
 c) means for coupling said at least one hand lever to said at least one brake mechanism whereby said at least one hand lever is movable between a first position in which said at least one brake mechanism is disengaged from the at least one wheel whereby the at least one wheel is free to rotate and a second depressed position in which a force is applied by said hand lever through said coupling means to said brake mechanism causing said at least one brake mechanism to engage the at least one wheel and slow down or halt rotation of the at least one wheel;
 d) said the at least one wheel is pivotally connected to the frame by a caster and said at least one brake mechanism is pivotally connected to the caster;
 e) said at least one brake mechanism includes a pivotal member pivotally connected to said caster and positioned adjacent the at least one wheel, said pivotal member being connected to and caused to pivot by said coupling means, said at least one brake mechanism further including a brake pad connected to an end of said pivotal member opposite said connection to said coupling means for engaging the at least one wheel when said at least one brake mechanism is in said second position;
 f) said pivotal member includes a first recess and said brake mechanism further includes a loop extending through said first recess and connected to said coupling means;
 g) said coupling means is a cable wire, said cable wire being pivotally connected to said loop;
 h) said brake mechanism further includes a return mechanism for pivoting said brake mechanism back to said first position upon release of said force on said at least one hand lever; and
 i) said caster is U-shaped and includes a back wall and said return mechanism includes a pin extending through the back wall for connection with said pivoting member, an adjustable stopper slidably positioned on said pin, and a first spring encircling said pin and positioned between the back wall and said adjustable stopper on a side of the back wall opposite said pivoting member, wherein said first spring is tensioned when said pivoting member is caused to pivot towards the at least one wheel and said first spring is able to recoil upon removal of said force on said hand lever thereby pivoting said brake assembly away from the at least one wheel and into aid first position.

6. The brake assisted steering system as recited in claim 5, further comprising a grip bar extending from the frame, said at least one hand lever being positioned on said grip bar.

7. The brake assisted steering system as recited in claim 6, wherein said grip bar and said frame are hollow, said coupling means extending within said grip bar and frame between said at least one hand lever and at least one brake mechanism.

8. A brake assisted steering system for controlling movement of, and in combination with, a bed including a frame and at least one wheel connected to the frame, said brake assisted steering system comprising:
 a) at least one lever;
 b) at least one brake mechanism positioned adjacent said at least one wheel;
 c) means for coupling said at least one hand lever to said at least one brake mechanism whereby said at least one hand lever is movable between a first position in which said at least one brake mechanism is disengaged from the at least one wheel whereby the at least one wheel is free to rotate and a second depressed position in which a force is applied by said hand lever through said coupling means to said brake mechanism causing said at least one brake mechanism to engage the at least one wheel and slow down or halt rotation of the at least one wheel; and
 d) a stopper positioned around said coupling means adjacent said connection to said at least one hand lever and a second spring encircling said coupling means and positioned between said connection and said stopper wherein application of said force to said at least one hand lever causes said coupling means and said stopper to be moved towards said at least one hand lever thereby tensioning said second spring and removal of said force causes said first spring to recoil and apply a force against said stopper causing said stopper and coupling means to return to said first position.

9. A brake assisted steering system for use in controlling movement of a bed including a frame and first and second wheels extending from the frame, said brake assisted steering system comprising:
 a) a first hand lever;
 b) a second hand lever;
 c) a first brake mechanism positioned adjacent the first wheel;
 d) a second brake mechanism positioned adjacent the second wheel;
 e) first means for coupling said first hand lever and said first brake mechanism;
 f) second means for coupling said second hand lever t said second brake mechanism whereby said first hand lever is movable between a first position in which said first brake mechanism is disengaged from the first wheel thereby allowing the first wheel to rotate and a second depressed position in which a force is applied to said first brake mechanism causing said first brake mechanism to engage the first wheel thereby slowing down or preventing rotation of the first wheel and said second hand lever is movable between a first position in which said second brake mechanism is disengaged from the second wheel allowing the second wheel to rotate and a second depressed position in which a force is applied to said second brake mechanism causing said second brake mechanism to engage the second wheel thereby slowing down or preventing rotation of the second wheel; and
 g) a stopper positioned around said first coupling means adjacent said connection to said first hand lever and a second spring encircling said first coupling means and positioned between said connection and stopper wherein application of said force to said first hand lever causes said first coupling means and said stopper to be moved towards said first hand lever thereby tensioning said second spring and removal of said force causes said second spring to recoil and apply a force against said stopper causing said stopper and first coupling means to return to said first position.

10. The brake assisted steering system as recited in claim 9, further comprising a stopper positioned around said second coupling means adjacent said connection to said second hand lever and a second spring encircling said second coupling means and positioned between said connection and stopper wherein application of said force to said second hand lever causes said second coupling means and said stopper to be moved towards said second hand lever thereby tensioning said second spring and removal of said force causes said second spring to recoil and apply a force against said stopper causing said stopper and second coupling means to return to said second position.

* * * * *